(12) United States Patent
Lumpp et al.

(10) Patent No.: US 8,316,383 B2
(45) Date of Patent: Nov. 20, 2012

(54) DETERMINING AVAILABILITY PARAMETERS OF RESOURCE IN HETEROGENEOUS COMPUTING ENVIRONMENT

(75) Inventors: Thomas Lumpp, Pliezhausen (DE); Wolfgang Schaeberle, Nufringen (DE); Juergen Schneider, Althengstett (DE); Isabell Schwertle, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 12/344,907

(22) Filed: Dec. 29, 2008

(65) Prior Publication Data

US 2010/0169703 A1 Jul. 1, 2010

(51) Int. Cl.
*G06F 9/54* (2006.01)
(52) U.S. Cl. ............................. 719/318; 714/2
(58) Field of Classification Search .................. 719/318; 709/224; 714/49, 2
See application file for complete search history.

(56) References Cited

U.S. PATENT DOCUMENTS

| | | | |
|---|---|---|---|
| 6,594,786 B1 | 7/2003 | Connelly et al. | |
| 6,996,502 B2 | 2/2006 | De La Cruz et al. | |
| 8,037,341 B2 | 10/2011 | Lumpp et al. | |
| 2004/0049365 A1 | 3/2004 | Keller et al. | |
| 2005/0015777 A1* | 1/2005 | Liss et al. ................. | 719/318 |
| 2006/0074993 A1 | 4/2006 | Pulamarasetti et al. | |
| 2006/0129367 A1* | 6/2006 | Mishra et al. ............. | 703/13 |
| 2007/0260908 A1 | 11/2007 | Mitchell et al. | |
| 2008/0109822 A1* | 5/2008 | Chokshi et al. ........... | 719/318 |
| 2008/0189717 A1 | 8/2008 | Agarwal et al. | |
| 2009/0158292 A1 | 6/2009 | Rattner et al. | |
| 2009/0165002 A1 | 6/2009 | Sterbenz | |
| 2009/0172149 A1* | 7/2009 | Bobak et al. .............. | 709/224 |
| 2009/0172461 A1 | 7/2009 | Bobak et al. | |
| 2009/0313626 A1 | 12/2009 | Dawson et al. | |
| 2010/0169703 A1 | 7/2010 | Lumpp et al. | |
| 2010/0169720 A1 | 7/2010 | Lumpp et al. | |

OTHER PUBLICATIONS

Haberkorn, M.; Trivedi, K. , "Availability Monitor for a Software Based System," High Assurance Systems Engineering Symposium, 2007. HASE '07. 10th IEEE, pp. 321-328, (Nov. 14-16, 2007) [retrieved from http://ieeexplore.ieee.org/stamp/stamp.jsp?tp=&arnumber=4404756&isnumber=4404712].*
Holl, G., "IBM Tivoli System Automation using the TSAfMP v2.1 End-to-End Automation feature" (Dec. 6, 2005) [retrieved from http://www-01.ibm.com/support/docview.wss?uid=swg27008134&aid=1].*
U.S. Appl. No. 12/344,893.
U.S. Appl. No. 13/270,186, filed Oct. 10, 2011, 59 pages.

* cited by examiner

*Primary Examiner* — H. S. Sough
*Assistant Examiner* — Brian Wathen
(74) *Attorney, Agent, or Firm* — Francis Lammes; Stephen J. Walder, Jr.; Jeffrey S. LaBaw

(57) ABSTRACT

A mechanism is provided for determining an incident of a resource in a computing environment. An event pertaining to the resource is processed by a system automation module. The event is represented as an associated event data having parameters of a target state, a target state prior to the event, a current state, and a current state prior to the event. First, the target state is compared to the target state prior to the event to assure that the target state is steady. Wherein a determination that the event is an incident cannot be made after comparing the target state and the current state, the system automation module compares the current state to the current state prior to the event. Upon determining that the event is an incident, the event data is marked and stored in a repository.

12 Claims, 18 Drawing Sheets

Availability and recovery of a selected resource Report

Domain name:        FriendlyE2E
    Resource Name:     e2e.ga1/Resourcegroup
    Time Interval:       Apr. 11, 2008 10:30 AM – Apr. 11, 2008 5:30 PM Summary Overall uptime:                        3h 36min 43 sec
Includes
           Planned Uptime:     3h 36min 43sec
           Unplanned Uptime:  0sec Overall downtime:                   3h 15min 32sec
Includes
           Planned downtime:  3h 7min 2sec
           Unplanned Uptime:  6min 1sec
           Planned starttime:  2min 29sec Unknown:                               7min 45sec

*FIG. 11A*

Highest number of unexpected outages report

| | |
|---|---|
| Domain name: | FriendlyE2E |
| Time Interval: | Mar 26, 2008 12:00 AM – Apr 25, 2008 11:59 PM |
| Active policy at report generation: | Policy 1    Active since:   April 25, 2008 2:11 PM |
| Resource selection limited to: | ResourceReference |
| Number of displayed resources: | 10 |

List of resource with the highest number of unexpected outages

- 2: IMS Connect/ResourceRefer
- 1: Backend AppServer/Resource
- 4: SAP ENQ Server/ResourceReference
- 3: eMail Hosting0/ResourceReference
- 8: Http Server/ResourceReference
- 7: DB2/ResourceReference
- 6: DB2 Production Server FEPLEX2/SYS1/ResourceReference
- 5: DB2 Backup Server FEPLEX2/SYS5/ResourceReference
- 10: Frontend WebServer/ResourceReference
- 9: Banking Application/ResourceReference Number of outages

*FIG. 11G*

DETERMINING AVAILABILITY PARAMETERS OF RESOURCE IN HETEROGENEOUS COMPUTING ENVIRONMENT

CROSS REFERENCES TO RELATED INVENTIONS

This invention is related to U.S. patent application Ser. No. 12/344,893 entitled "SYSTEM AND METHOD FOR DETERMINING RECOVERY TIME FOR INTERDEPENDENT RESOURCES IN HETEROGENEOUS COMPUTING ENVIRONMENT", filed on even date herewith.

FIELD OF THE INVENTION

The present invention discloses a system and associated method for determining accurate availability parameters of hardware and/or software resources in heterogeneous computing environments.

BACKGROUND OF THE INVENTION

Conventional methods for measuring availability of a computing resource do not provide meaningful distinction between planned and unplanned downtimes. Because the planned downtimes for management purposes and the unplanned downtimes caused by failures affects the availability differently, without a well-defined distinction between planned downtimes and unplanned downtimes, availability measurement is not accurate and has no informative value.

Thus, there is a need for a system and associated method that overcomes at least one of the preceding disadvantages of current methods and systems of determining availability parameters.

SUMMARY OF THE INVENTION

The present invention provides a method for determining an incident of a resource in a computing environment, the method comprising:

selecting a target state and a current state of the resource upon detecting an occurrence of an event of at least one event pertaining to the resource, the target state being a state which the resource is planned to be in, the current state being a state which the resource is actually in, wherein an event data of at least one event data is associated with the first event;

determining that the first event occurred to the resource is incidental and instantiating the first event data accordingly; and storing the first event data in a data repository of the computing environment, wherein said selecting, said determining, and said storing are performed by a system automation module of the computing environment.

The present invention provides a computer program product, comprising a computer usable storage medium having a computer readable program code embodied therein, said computer readable program code containing instructions that when executed by a processor of a computer system implement a method for determining an incident of a resource in a computing environment, the method comprising:

selecting a target state and a current state of the resource upon detecting an occurrence of an event of at least one event pertaining to the resource, the target state being a state which the resource is planned to be in, the current state being a state which the resource is actually in, wherein an event data of at least one event data is associated with the first event;

determining that the first event occurred to the resource is incidental and instantiating the first event data accordingly; and storing the first event data in a data repository of the computing environment, wherein said selecting, said determining, and said storing are performed by a system automation module of the computing environment.

The present invention provides a computer system comprising a processor and a computer readable memory unit coupled to the processor, said memory unit containing instructions that when executed by the processor implement a method for determining an incident of a resource in a computing environment, the method comprising:

selecting a target state and a current state of the resource upon detecting an occurrence of an event of at least one event pertaining to the resource, the target state being a state which the resource is planned to be in, the current state being a state which the resource is actually in, wherein an event data of at least one event data is associated with the first event;

determining that the first event occurred to the resource is incidental and instantiating the first event data accordingly; and storing the first event data in a data repository of the computing environment, wherein said selecting, said determining, and said storing are performed by a system automation module of the computing environment.

The present invention provides a method and system that overcomes at least one of the current disadvantages of conventional method and system for determining availability parameters of a computing resource.

BRIEF DESCRIPTION OF THE DRAWINGS

FIGS. 11A, 11B, 11C, 11D, 11E, and 11F illustrate an example of a report on availability and recovery of a selected resource, in accordance with embodiments of the present invention.

FIG. 11G illustrates an example of an availability report on unplanned outages of multiple resources, in accordance with embodiments of the present invention.

DETAILED DESCRIPTION OF THE INVENTION

Figure 1:
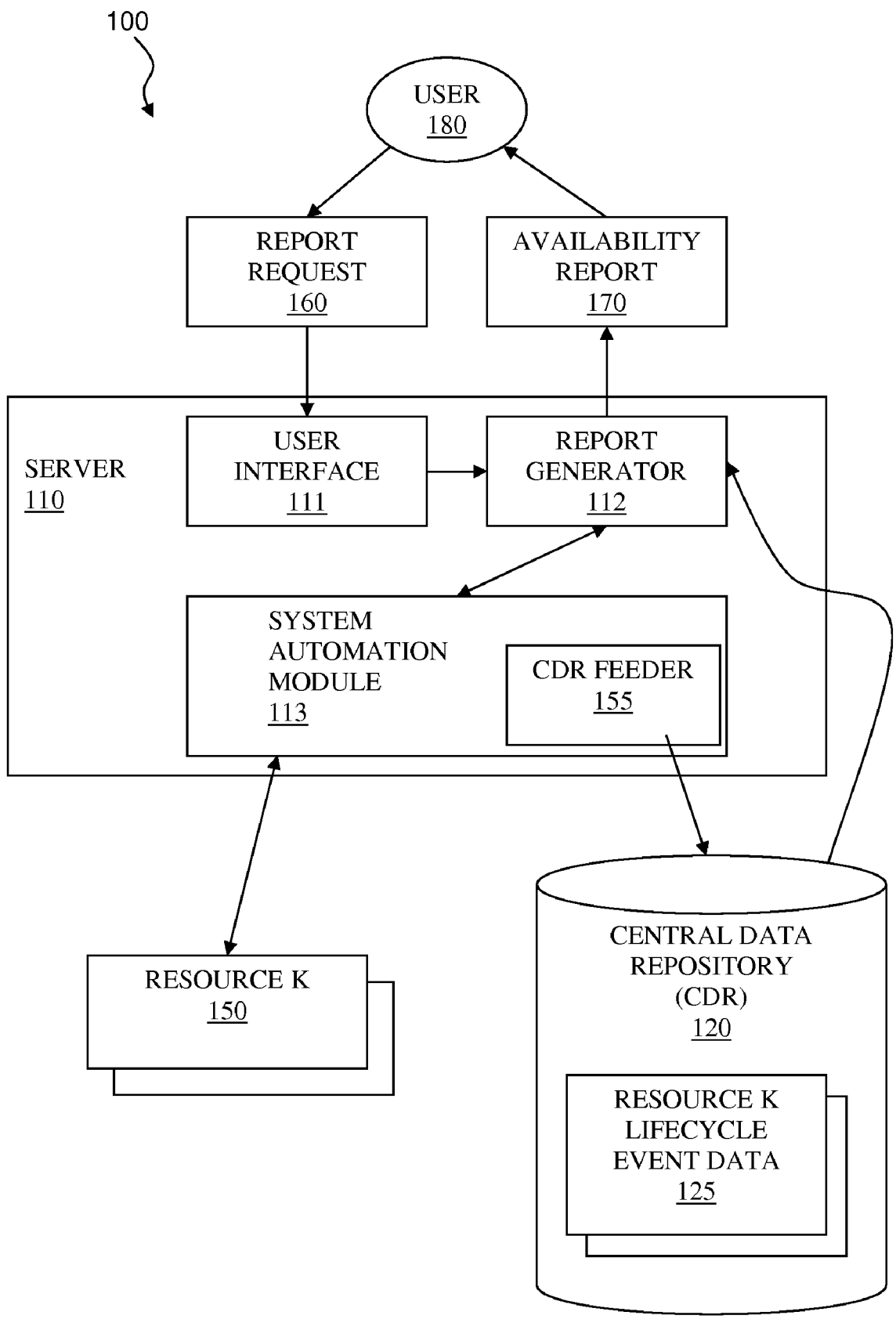
FIG. 1 illustrates a system 100 for determining availability parameters of a resource in a heterogeneous computing environment, in accordance with embodiments of the present invention.

FIG. 1 illustrates a system 100 for determining availability parameters of a resource in a heterogeneous computing environment, in accordance with embodiments of the present invention.

The system 100 comprises a server 110, at least one resource, and a central data repository (CDR) 120. The CDR 120 comprises lifecycle event data of said at least one resource.

The server 110 comprises a user interface 111, a report generator 112, and a system automation module 113.

The user interface 111 receives a report request 160 on availability parameters of a resource K 150 of said at least one resource from a user 180. The user interface 111 passes content of the report request 160 to the report generator 112 as an input.

The resource K 150 is any hardware and/or software computing resource that may be, inter alia, a piece of data such as an Internet Protocol (IP) address, a software program, a server, a storage device, or any combination of multiple resources such as a cluster of servers installed with multiple software programs, an integrated development environment, a database management system, etc.

The system automation module 113 processes a resource K lifecycle event data 125 stored in the CDR 120, and provides a result to the report generator 112.

The resource K lifecycle event data 125 is recorded in the CDR 120 by a CDR feeder 155 in the system automation module 113 upon occurrence of each resource K lifecycle event that is predetermined to be recorded. See description of FIG. 2, infra, for events necessary to be stored in the CDR 120.

The CDR feeder 155 determines whether each resource K lifecycle event is planned or unplanned as storing the resource K lifecycle event data in the CDR 120. See description of FIG. 4, infra, for details on operations of the CDR feeder 155.

The report generator 112 calculates availability parameters of Mean Time To Repair (MTTR) and Mean Time Between Failure (MTBF) of the resource K 150 with the lifecycle event data stored in the CDR 120, creates an availability report 170 pursuant to the report request 160, and returns the availability report 170 to the user 180. Availability of a resource is calculated with a formula (MTBF/(MTBF+MTTR)). Consequently, a decision as to whether the resource K 150 is in OFFLINE state as a planned repair or as an unplanned incident is critical in obtaining an accurate availability ratio for the resource K 150. See description of FIGS. 4 and 5, infra, for details on operations of the report generator 112.

In one embodiment of the present invention, the server 110 is an IBM® Websphere Application Server with Tivoli® System Automation for Application Manager (SA AM) installed and the user interface 111 is a web application. The report generator 112 employs the IBM Business Intelligence and Reporting Tools/Tivoli® Common Reporting (BIRT/TCR) infrastructure based on Java® and the Java 2 Platform Enterprise Edition (J2EE®) in servicing resource clusters such as Linux® servers and/or z/OS® Sysplex servers. The CDR 120 is DB2® database system. (IBM, Tivoli, z/OS, and DB2 are registered trademarks of the International Business Machines, Inc., in the United States and/or other countries; Linux is a registered trademark of Linus Torvalds in the United States and/or other countries; and Java and J2EE are registered trademarks of the Sun Microsystems, Inc., in the United States and/or other countries.)

Figure 2:
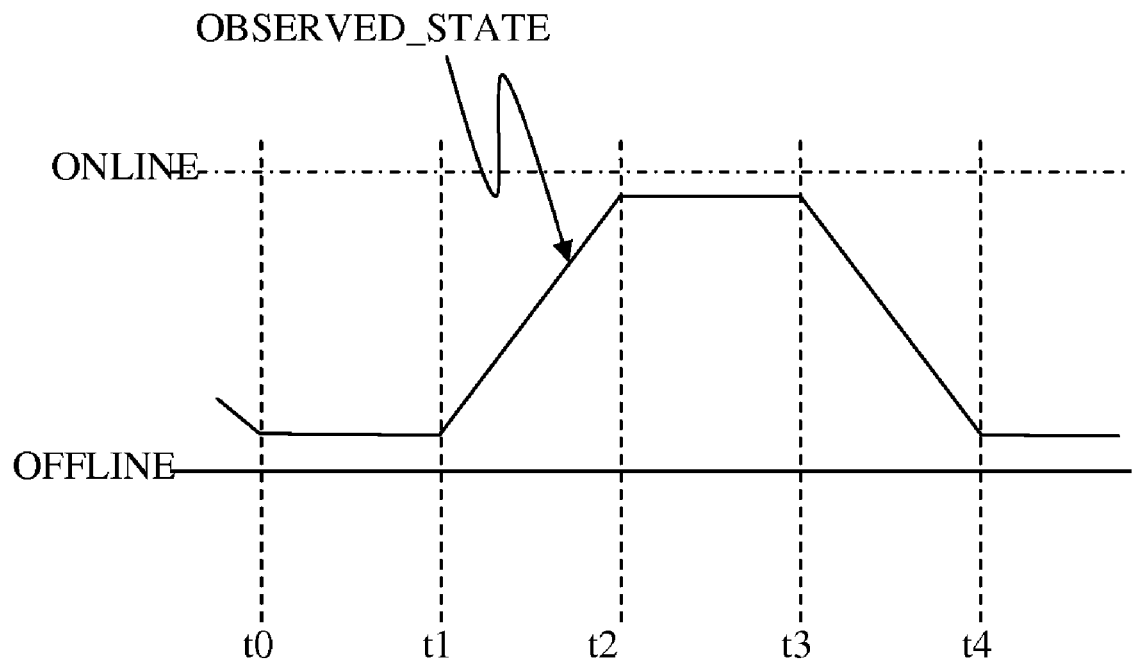
FIG. 2 illustrates lifecycle events of a resource, in accordance with the embodiments of the present invention.

FIG. 2 illustrates lifecycle events of a resource, in accordance with the embodiments of the present invention.

The CDR feeder of the present invention records state transitions of the resource as lifecycle event data for the resource in the Central Data Repository (CDR). See description of FIG. 3, infra, for parameters of lifecycle event data.

There are four state phases for the resource, which are {OFFLINE, STARTUP, ONLINE, SHUTDOWN}. OFFLINE is a state phase during which the resource is not active. ONLINE is a state phase during which the resource is actively running. STARTUP is a state phase during which the resource is moving from OFFLINE to ONLINE. SHUTDOWN is a state phase during which the resource is moving from ONLINE to OFFLINE.

A period of time between t0 and t1 is a downtime of the resource. At time t1, the resource changes the state from OFFLINE to STARTUP as the resource is getting started. At time t2, the resource changes the state from STARTUP to ONLINE as the resource is fully started and actively running. At time t3, the resource changes the state from ONLINE to SHUTDOWN as the resource is stopping. At time t4, the resource changes the state from SHUTDOWN to OFFLINE as the resource completely stops and becomes inactive.

Figure 3:
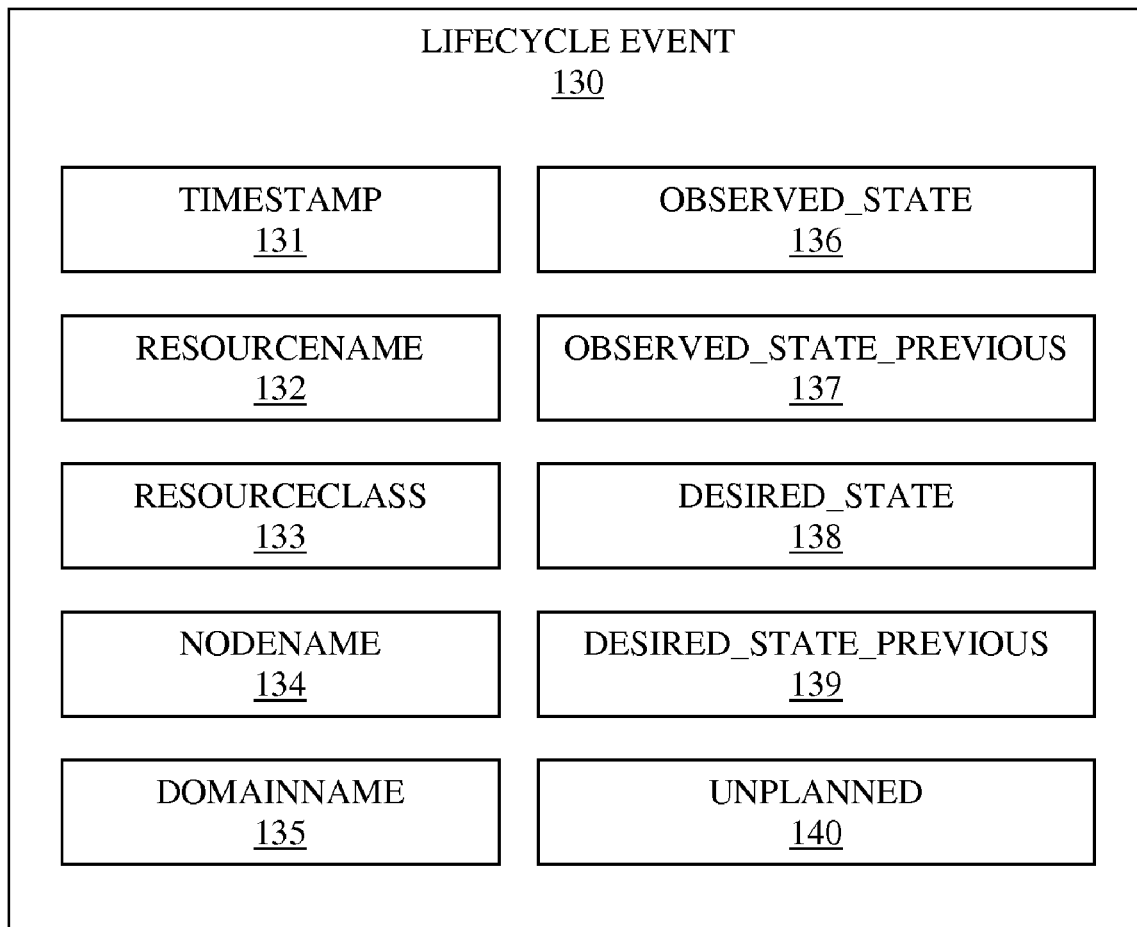
FIG. 3 illustrates parameters of lifecycle event data of a resource as represented in a Central Data Repository (CDR), in accordance with the embodiments of the present invention.

FIG. 3 illustrates parameters of lifecycle event data of a resource as represented in the Central Data Repository (CDR), in accordance with the embodiments of the present invention.

The parameters of lifecycle event data 130 of the resource comprises a TIMESTAMP 131, a RESOURCENAME 132, a RESOURCECLASS 133, a NODENAME 134, a DOMAINNAME 135, an OBSERVED_STATE 136, an OBSERVED_STATE_PREVIOUS 137, a DESIRED_STATE 138, a DESIRED_STATE_PREVIOUS 139, and an UNPLANNED 140.

The TIMESTAMP 131 is a point of time when a lifecycle event occurred.

The RESOURCENAME 132 is a name of the resource wherein the lifecycle event occurred. The RESOURCECLASS 133 is a class to which the resource is a member. The NODENAME 134 denotes a node in which the resource is operating. The DOMAINNAME 135 is a name of a domain to which the resource is an element. The resource is identified by a combination of the RESOURCENAME 132, the RESOURCECLASS 133, the NODENAME 134, and the DOMAINNAME 135.

The OBSERVED_STATE 136 is an actual state of the resource at the time when the lifecycle event occurs. The OBSERVED_STATE_PREVIOUS 137 is an actual state of the resource prior to the time when the lifecycle event occurs. The OBSERVED_STATE 136 and the OBSERVED_STATE_PREVIOUS 137 may have values of {OFFLINE, STARTUP, ONLINE, SHUTDOWN}.

The DESIRED_STATE 138 is a target state of the resource at the time when the lifecycle event occurs. The DESIRED_STATE_PREVIOUS 139 is a target state of the resource prior to the time when the lifecycle event occurs. The DESIRED_STATE 138 and the DESIRED_STATE_PREVIOUS 139 may have values of {ONLINE, OFFLINE}.

The UNPLANNED 140 indicates a determination as to whether the lifecycle event is unplanned. The UNPLANNED 140 may have values of {TRUE, FALSE} for an unplanned lifecycle event and a planned lifecycle event, respectively. See description of FIG. 4, infra, on how to determine a value of the UNPLANNED parameter.

Figure 4:
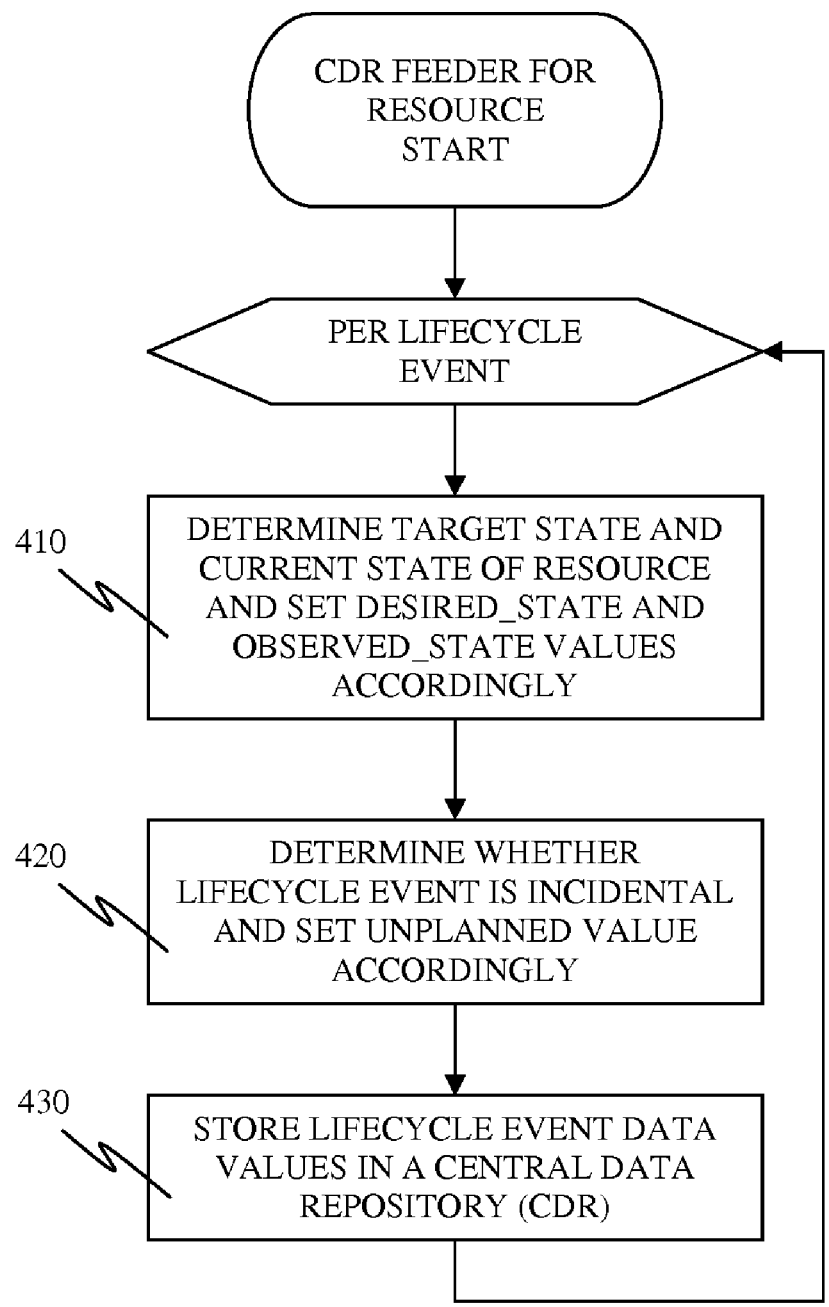
FIG. 4 is a flowchart for recording a lifecycle event of a resource in a Central Data Repository (CDR) by a CDR feeder associated with the resource, in accordance with the embodiments of the present invention.

FIG. 4 is a flowchart for recording a lifecycle event of a resource in the Central Data Repository (CDR) by a CDR feeder associated with the resource, in accordance with the embodiments of the present invention.

In step 410, upon detecting occurrence of the lifecycle event, the CDR feeder determines a target state of the resource and sets the target state as a value for the DESIRED_STATE. The CDR feeder checks a current state of the resource and sets the current state as a value for the OBSERVED_STATE.

The lifecycle event is defined as a change of either the target state or the current state, as represented in values of the DESIRED_STATE and the OBSERVED_STATE, respectively. The target state defines a plan for using the resource and changes in the target state are deemed planned and made automatically by a schedule or a program, or manually by an operator. The change of the target state is determined by comparing values of the DESIRED_STATE and the DESIRED_STATE_PREVIOUS. Wherein the target state changes, because the plan has changed, it is unnecessary to determine whether the current state has changed. The change of the current state is determined by comparing values of the OBSERVED_STATE and the OBSERVED_STATE_PREVIOUS.

In step 420, the CDR feeder determines whether the lifecycle event is either planned or unplanned by comparing the target state and the current state. If the CDR feeder determines that the lifecycle event is planned, the CDR feeder sets FALSE as a value of the UNPLANNED parameter. If the CDR feeder determines that the lifecycle event is unplanned, the CDR feeder sets TRUE as a value of the UNPLANNED parameter.

If the current state progresses into a state farther from the target state, the lifecycle event is determined as unplanned. See description of FIGS. 6A, 6B, 7A, and 7B, infra, on how to determine the UNPLANNED parameter value. In descriptions of FIGS. 6A, 6B, 7A, and 7B, the DESIRED_STATE remains the same throughout the entire time determining each UNPLANNED parameter value.

In step 430, the CDR feeder stores the lifecycle event in the CDR as all parameters of the lifecycle event data are instantiated.

Figure 5:
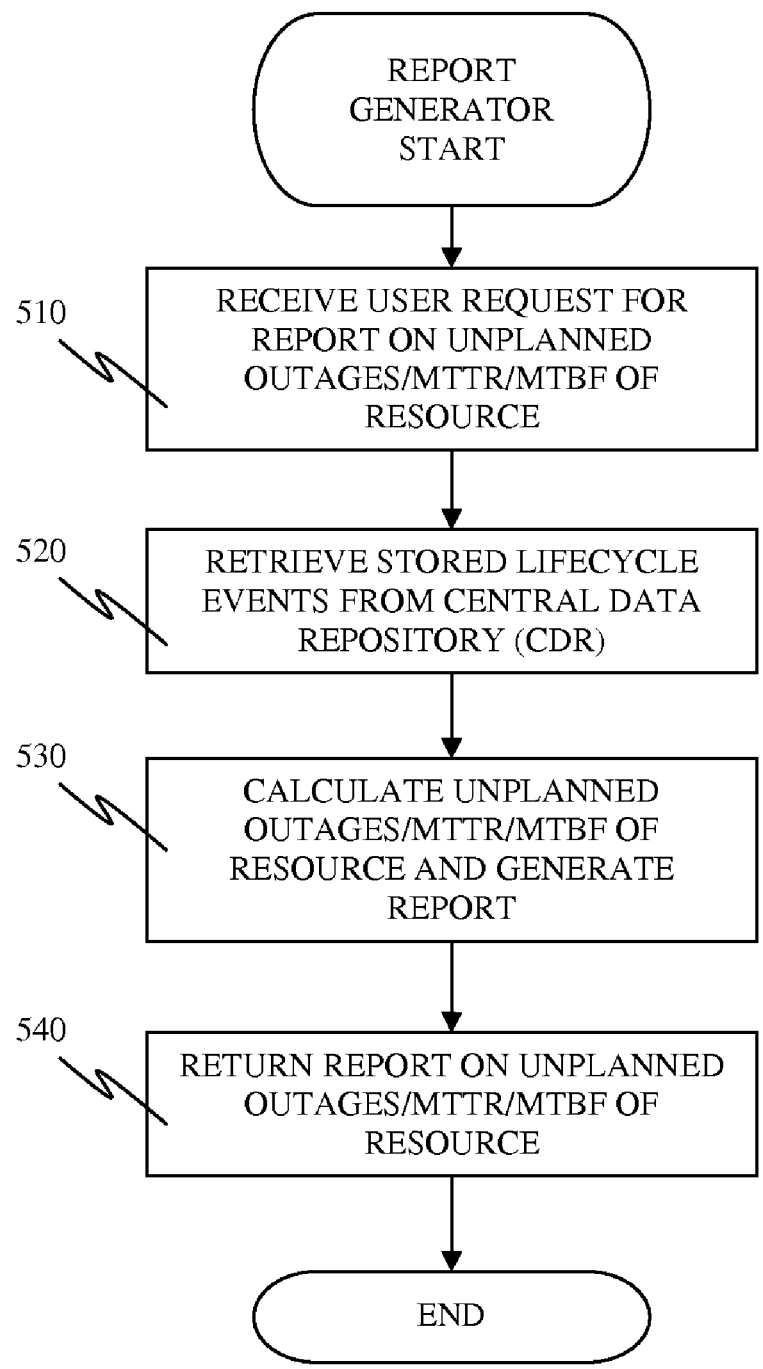
FIG. 5 is a flowchart for a report generator processing a request for a report on availability parameters of a resource, in accordance with the embodiments of the present invention.

FIG. 5 is a flowchart for a report generator processing a request for a report on availability parameters of a resource, in accordance with the embodiments of the present invention.

In step 510, the report generator receives the request for the report on availability parameters of the resource from a user through a user interface. The availability parameters to be reported to the user may include, inter alia, a number of unplanned outages for the resource, the Mean Time To Repair (MTTR), the Mean Time Between Failure (MTBF), etc. As aforementioned, availability of a resource is calculated with a formula (MTBF/(MTBF+MTTR)).

In step 520, the report generator retrieves lifecycle event data for the resource from the Central Data Repository (CDR).

In step 530, the report generator calculates availability parameters and generates the report. In calculating the MTTR and the MTBF, the report generator uses values of the TIMESTAMP parameter of retrieved lifecycle event data.

In step 540, the report generator returns the generated report on availability parameters to the user.

In one embodiment of the present invention, a request for a report on unplanned outages of a DB2 database is received in step 510. The report generator searches the CDR for all lifecycle event data having a value of the OBSERVED_STATE parameter of OFFLINE and a value of the UNPLANNED parameter of TRUE in step 520.

Figure 6A:
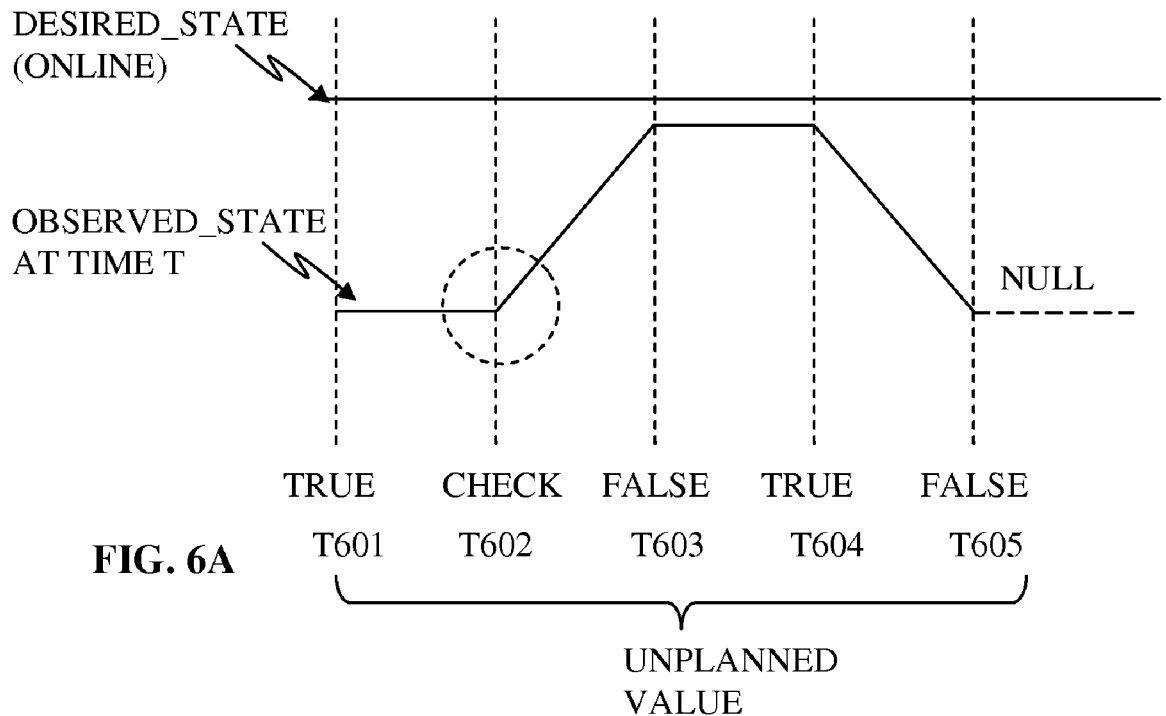
FIGS. 6A and 6B illustrate values for the UNPLANNED parameter when the DESIRED_STATE is ONLINE, in accordance with the embodiments of the present invention.
Figure 6B:
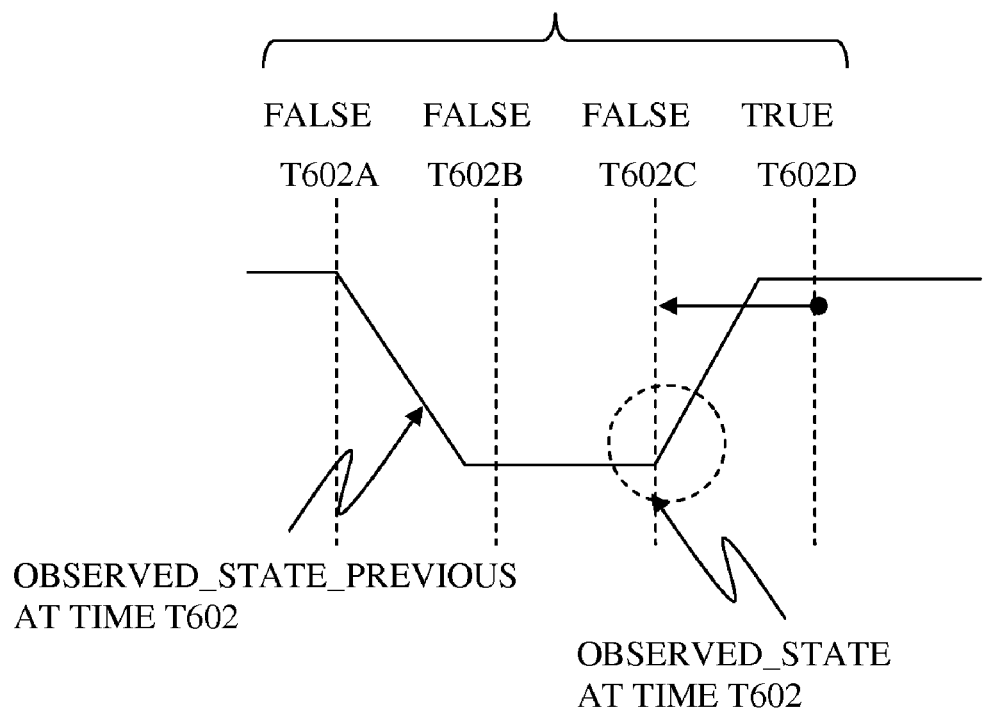

FIGS. 6A and 6B illustrate values for an UNPLANNED parameter when a DESIRED_STATE is ONLINE, in accordance with the embodiments of the present invention.

FIG. 6A illustrates values for the UNPLANNED parameter by comparing the DESIRED_STATE with an OBSERVED_STATE, in accordance with the embodiments of the present invention.

A respective lifecycle event, i.e., state transition, in a resource occurs at each time stamp t601, t602, t603, t604, and t605.

At time t601, the OBSERVED_STATE is OFFLINE, which is the opposite of the DESIRED_STATE of ONLINE. Consequently the lifecycle event is unplanned and the UNPLANNED value of the lifecycle event data for the resource at time t601 is TRUE.

At time t602, the OBSERVED_STATE is STARTUP, which is different from the DESIRED_STATE of ONLINE. However, because STARTUP is a transitional state immediately prior to the DESIRED_STATE of ONLINE, an OBSERVED_STATE_PREVIOUS is looked into to determine the UNPLANNED value at time t602. See description of FIG. 6B, infra, for details on interpreting values of the OBSERVED_STATE_PREVIOUS against the OBSERVED_STATE at time t602.

At time t603, the OBSERVED_STATE is ONLINE, which is equal to the DESIRED_STATE of ONLINE. Consequently the lifecycle event is planned and the UNPLANNED value at time t603 is FALSE.

At time t604, the OBSERVED_STATE is SHUTDOWN, which is different from the DESIRED_STATE of ONLINE. The state SHUTDOWN is a state leading to OFFLINE that is the opposite of the DESIRED_STATE of ONLINE. Consequently the lifecycle event is unplanned and the UNPLANNED value at time t604 is TRUE.

At time t605, the OBSERVED_STATE cannot be determined. The UNPLANNED value at time t605 is determined as FALSE to accurately count a number of failures in the resource as intended in the method of the present invention. In another embodiment, the UNPLANNED is set to TRUE wherein the OBSERVED_STATE cannot be determined, to count as many failures as possible.

FIG. 6B illustrates values for the UNPLANNED parameter by comparing the OBSERVED_STATE of STARTUP with the OBSERVED_STATE_PREVIOUS, in accordance with the embodiments of the present invention.

In case of t602A, the OBSERVED_STATE_PREVIOUS is SHUTDOWN such that the resource changes the state from SHUTDOWN to STARTUP, which indicates the resource transits toward the DESIRED_STATE of ONLINE. Consequently, the lifecycle event is planned and the UNPLANNED value at time t602 is FALSE.

In case of t602B, the OBSERVED_STATE_PREVIOUS is OFFLINE such that the resource changes the state from OFFLINE to STARTUP, which indicates the resource transits toward the DESIRED_STATE of ONLINE. Consequently, the lifecycle event is planned and the UNPLANNED value at time t602 is FALSE.

In case of t602C, the OBSERVED_STATE_PREVIOUS is STARTUP such that the resource stays in the same state at a time when the OBSERVED_STATE_PREVIOUS is checked and at a time t602. Because STARUP is a state transiting toward the DESIRED_STATE of ONLINE, the lifecycle event is determined as planned and the UNPLANNED value at time t602 is FALSE.

In case of t602D, the OBSERVED_STATE_PREVIOUS is ONLINE such that the resource changes the state from ONLINE to STARTUP. The resource was in the DESIRED_STATE of ONLINE as recorded in the OBSERVED_STATE_PREVIOUS of ONLINE, and the resource changed the state from the DESIRED_STATE of ONLINE as shown in the OBSERVED_STATE of STARTUP. The state transition indicates that an unplanned incident had happened in between the times for the OBSERVED_STATE_PREVIOUS and the OBSERVED_STATE. Consequently, the lifecycle event is determined as unplanned and the UNPLANNED value at time t602 is TRUE.

Figure 7A:
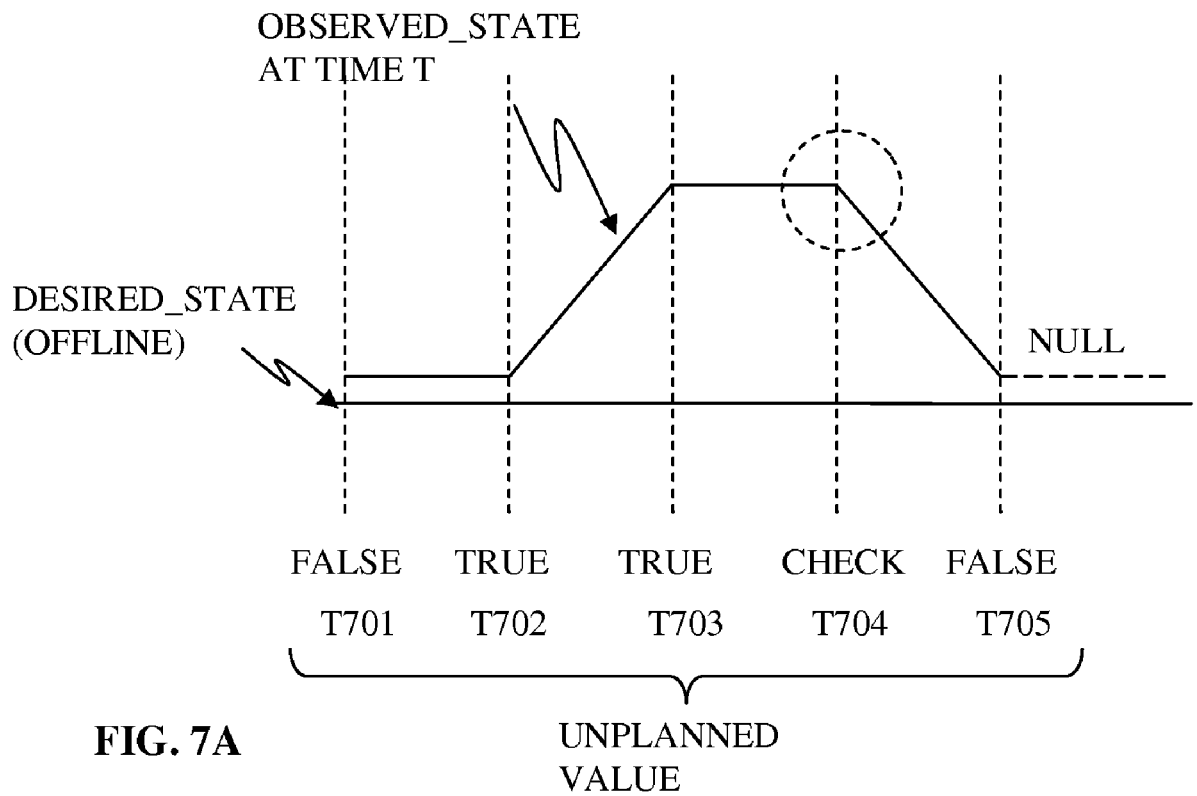
FIGS. 7A and 7B illustrate values for the UNPLANNED parameter when the DESIRED_STATE is OFFLINE, in accordance with the embodiments of the present invention.
Figure 7B:
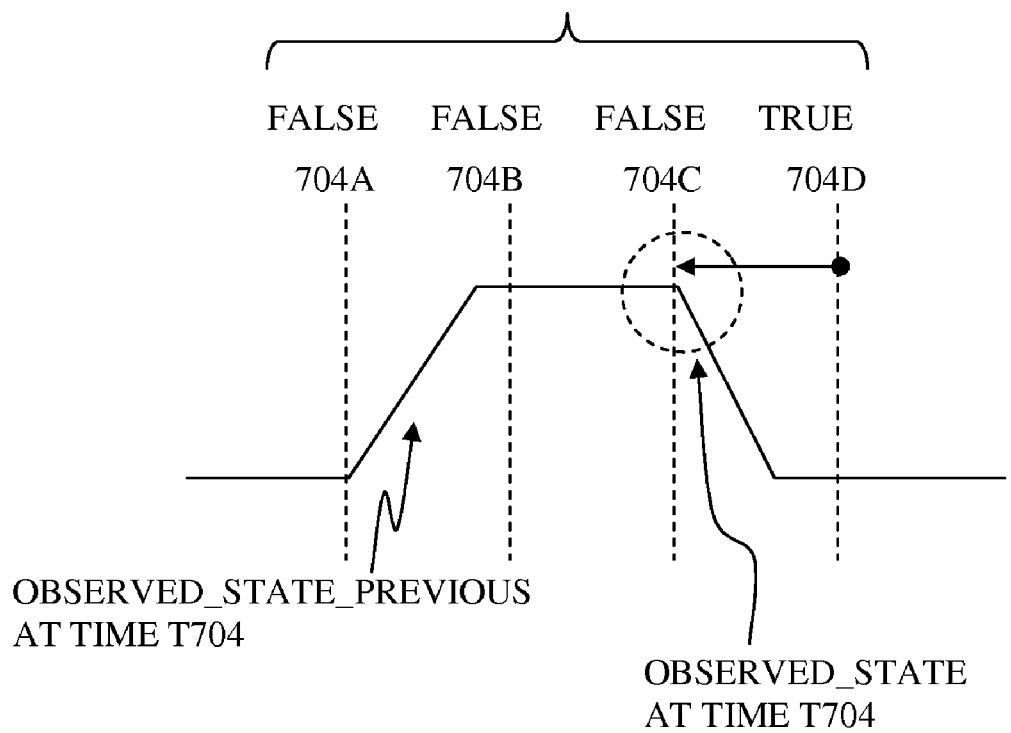

FIGS. 7A and 7B illustrate values for the UNPLANNED parameter when the DESIRED_STATE is OFFLINE, in accordance with the embodiments of the present invention.

FIG. 7A illustrates values for the UNPLANNED parameter by comparing the DESIRED_STATE with an OBSERVED_STATE, in accordance with the embodiments of the present invention.

A respective lifecycle event, i.e., state transition, in a resource occurs at each time stamp t701, t702, t703, t704, and t705.

At time t701, the OBSERVED_STATE is OFFLINE, which is equal to the DESIRED_STATE of OFFLINE. Consequently the lifecycle event is planned and the UNPLANNED value at time t701 is FALSE.

At time t702, the OBSERVED_STATE is STARTUP, which is different from the DESIRED_STATE of OFFLINE. The state STARTUP is a state leading to ONLINE that is the opposite of the DESIRED_STATE of OFFLINE. Consequently the lifecycle event is unplanned and the UNPLANNED value at time t702 is TRUE.

At time t703, the OBSERVED_STATE is ONLINE, which is the opposite of the DESIRED_STATE of OFFLINE. Consequently the lifecycle event is unplanned and the UNPLANNED value of the lifecycle event data for the resource at time t703 is TRUE.

At time t704, the OBSERVED_STATE is SHUTDOWN, which is different from the DESIRED_STATE of OFFLINE. However, because SHUTDOWN is a transitional state immediately prior to the DESIRED_STATE of OFFLINE, an OBSERVED_STATE_PREVIOUS is looked into to determine the UNPLANNED value at time t704. See description of FIG. 7B, infra, for details on interpreting values of the OBSERVED_STATE_PREVIOUS against the OBSERVED_STATE at time t704.

At time t705, the OBSERVED_STATE cannot be determined. The UNPLANNED value at time t705 is determined as FALSE to accurately count a number of failures in the resource as intended in the method of the present invention. In other embodiment, the UNPLANNED is set to TRUE wherein the OBSERVED_STATE cannot be determined, to count as many failures as possible.

FIG. 7B illustrates values for the UNPLANNED parameter by comparing the OBSERVED_STATE of SHUTDOWN with the OBSERVED_STATE_PREVIOUS, in accordance with the embodiments of the present invention.

In case of t704A, the OBSERVED_STATE_PREVIOUS is STARTUP such that the resource changes the state from STARTUP to SHUTDOWN, which indicates the resource transits toward the DESIRED_STATE of OFFLINE. Consequently, the lifecycle event at time t704 is planned and the UNPLANNED value is FALSE.

In case of t704B, the OBSERVED_STATE_PREVIOUS is ONLINE such that the resource changes the state from ONLINE to SHUTDOWN, which indicates the resource transits toward the DESIRED_STATE of OFFLINE. Consequently, the lifecycle event at time t704 is planned and the UNPLANNED value is FALSE.

In case of t704C, the OBSERVED_STATE_PREVIOUS is SHUTDOWN such that the resource stays in the same state at a time when the OBSERVED_STATE_PREVIOUS is checked and at a time t704. Because SHUTDOWN is a state transiting toward the DESIRED_STATE of OFFLINE, the lifecycle event at time t704 is determined as planned and the UNPLANNED value is FALSE.

In case of t704D, the OBSERVED_STATE_PREVIOUS is OFFLINE such that the resource changes the state from OFFLINE to SHUTDOWN. The resource was in the DESIRED_STATE of OFFLINE as recorded in the OBSERVED_STATE_PREVIOUS of OFFLINE, and the resource changed the state from the DESIRED_STATE of OFFLINE as shown in the OBSERVED_STATE of SHUTDOWN. The state transition indicates that an unplanned incident had happened in between the times for the OBSERVED_STATE_PREVIOUS and the OBSERVED_STATE. Consequently, the lifecycle event at time t704 is determined as unplanned and the UNPLANNED value is TRUE.

Figure 8:
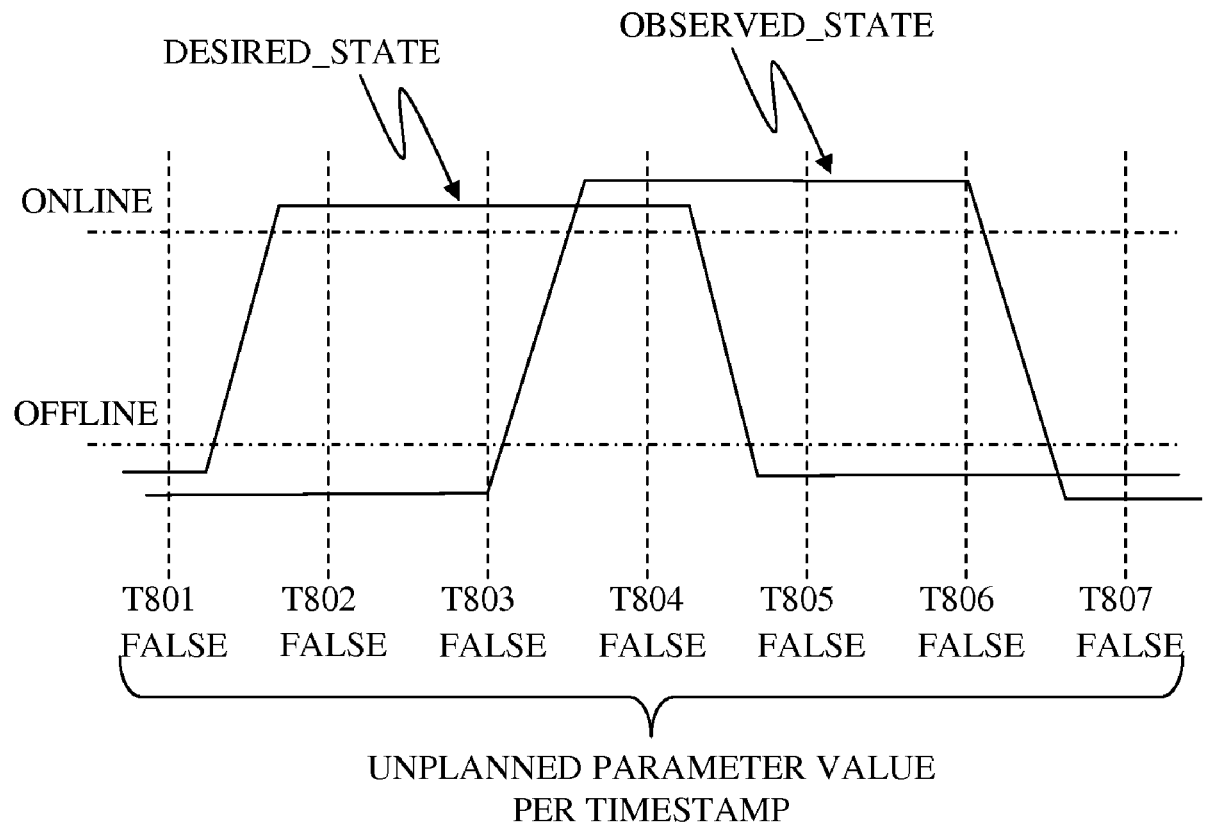
FIG. 8 illustrates a first scenario wherein a resource starts up and shuts down as planned, in accordance with the embodiments of the present invention.

FIG. 8 illustrates a first scenario wherein a resource starts up and shuts down as planned, in accordance with the embodiments of the present invention.

At time t801, a DESIRED_STATE of the resource is OFFLINE and an OBSERVED_STATE of the resource is OFFLINE. Because the OBSERVED_STATE is equal to the DESIRED_STATE of OFFLINE, a lifecycle event at time t801 is determined as planned and the UNPLANNED value of the lifecycle event is FALSE.

At time t802, the DESIRED_STATE is changed from ONLINE at time t801 to OFFLINE at time t802, a lifecycle event at time t802 is determined as planned and the UNPLANNED value of the lifecycle event is FALSE.

At time t803, the DESIRED_STATE remains ONLINE and the OBSERVED_STATE is STARTUP. Because the resource transits toward the DESIRED_STATE of ONLINE, a lifecycle event at time t803 is determined as planned and the UNPLANNED value of the lifecycle event is FALSE.

At time t804, the DESIRED_STATE remains ONLINE and the OBSERVED_STATE is ONLINE. Because the OBSERVED_STATE is equal to the DESIRED_STATE of ONLINE, a lifecycle event at time t804 is determined as planned and the UNPLANNED value of the lifecycle event is FALSE.

At time t805, the DESIRED_STATE is changed from ONLINE at time t804 to OFFLINE at time t805, a lifecycle event at time t805 is determined as planned and the UNPLANNED value of the lifecycle event is FALSE.

At time t806, the DESIRED_STATE remains OFFLINE and the OBSERVED_STATE is SHUTDOWN. Because the resource transits toward the DESIRED_STATE of OFFLINE, a lifecycle event at time t806 is determined as planned and the UNPLANNED value of the lifecycle event is FALSE.

At time t807, the DESIRED_STATE remains OFFLINE and the OBSERVED_STATE is OFFLINE. Because the OBSERVED_STATE is equal to the DESIRED_STATE of OFFLINE, a lifecycle event at time t807 is determined as planned and the UNPLANNED value of the lifecycle event is FALSE.

Figure 9:
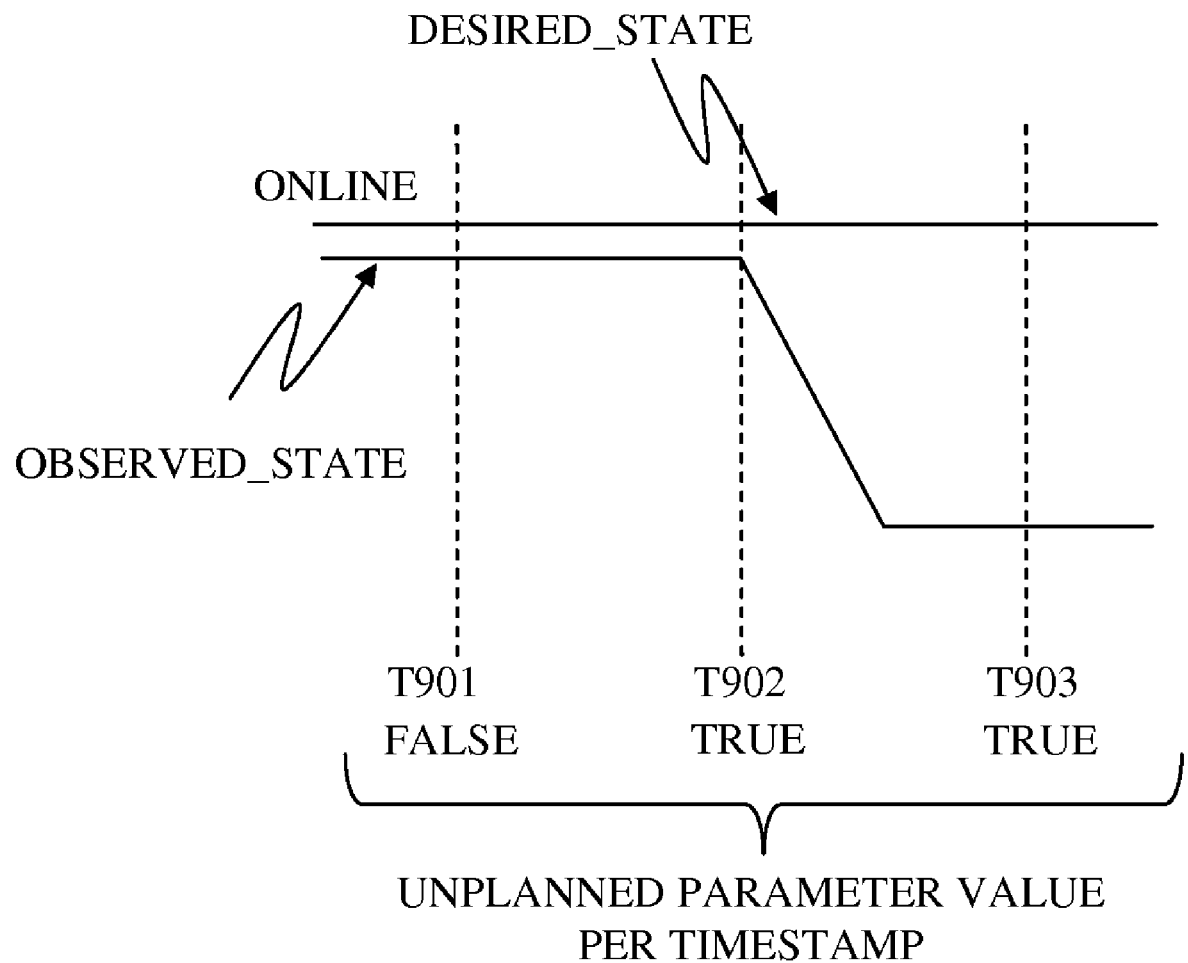
FIG. 9 illustrates a second scenario wherein a resource goes through an unplanned incident, in accordance with the embodiments of the present invention.

FIG. 9 illustrates a second scenario wherein a resource goes through an unplanned incident, in accordance with the embodiments of the present invention.

At time t901, a DESIRED_STATE of the resource is ONLINE and an OBSERVED_STATE of the resource is ONLINE. Because the OBSERVED_STATE is equal to the DESIRED_STATE of ONLINE, a lifecycle event at time t901 is determined as planned and the UNPLANNED value of the lifecycle event is FALSE.

At time t902, the DESIRED_STATE remains ONLINE and the OBSERVED_STATE is SHUTDOWN. Because the resource transits away from the DESIRED_STATE of ONLINE, a lifecycle event at time t902 is determined as unplanned and the UNPLANNED value of the lifecycle event is TRUE.

At time t903, the DESIRED_STATE remains ONLINE and the OBSERVED_STATE is OFFLINE. Because the resource is in a state opposite of the DESIRED_STATE of ONLINE, a lifecycle event at time t903 is determined as unplanned and the UNPLANNED value of the lifecycle event is TRUE.

Figure 10:
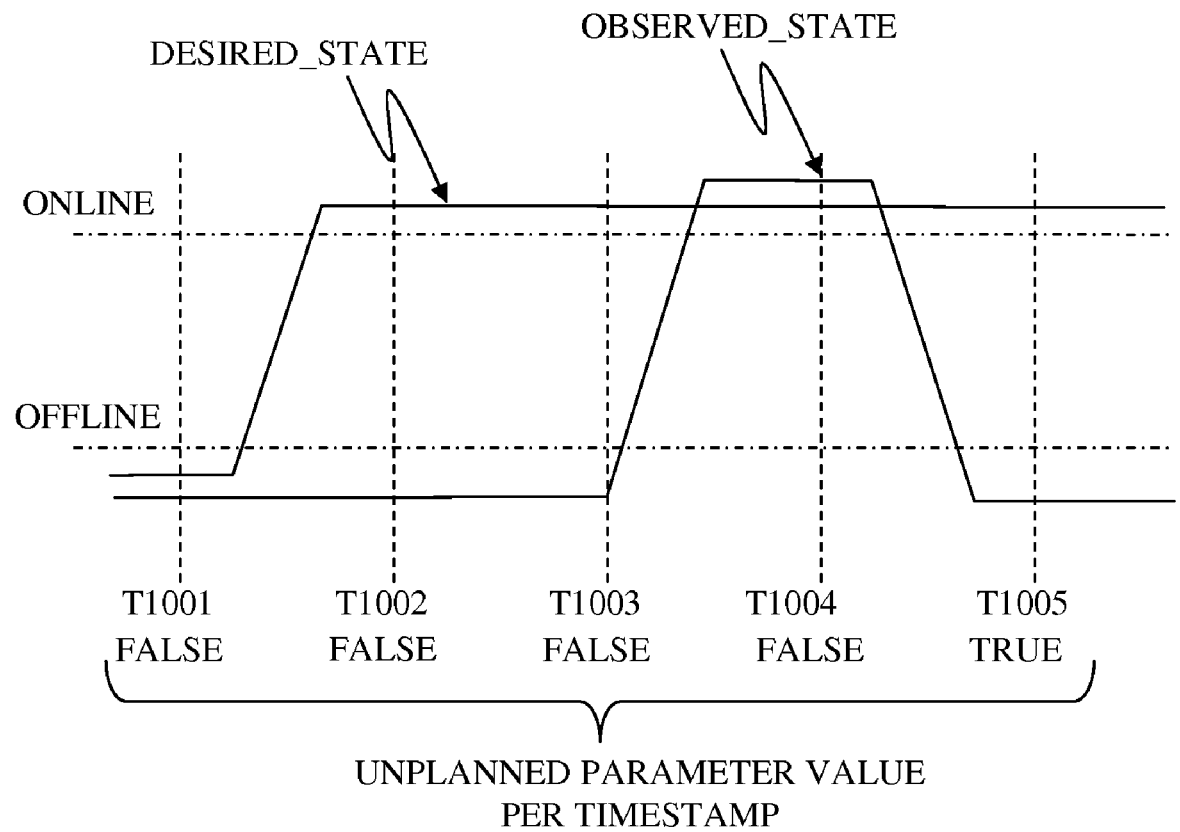
FIG. 10 illustrates a third scenario wherein a database is set up and goes through a failure during service, in accordance with the embodiments of the present invention.

FIG. 10 illustrates a third scenario wherein a database is set up and goes through a failure during service, in accordance with the embodiments of the present invention.

At time t1001, a DESIRED_STATE of the database is OFFLINE and an OBSERVED_STATE of the database is OFFLINE as the database is installed in a server. Because the OBSERVED_STATE is equal to the DESIRED_STATE of OFFLINE, a lifecycle event at time t1001 is determined as planned and the UNPLANNED value of the lifecycle event is FALSE.

At time t1002, the DESIRED_STATE is changed to ONLINE from OFFLINE as the database is started for service. Because the DESIRED_STATE is a plan, a lifecycle event at time t1002 is determined as planned and the UNPLANNED value of the lifecycle event is FALSE.

At time t1003, the DESIRED_STATE remains ONLINE and the OBSERVED_STATE is STARTUP as being started as planned. Because the database transits toward the DESIRED_STATE of ONLINE, a lifecycle event at time t1003 is determined as planned and the UNPLANNED value of the lifecycle event is FALSE.

At time t1004, the DESIRED_STATE remains ONLINE and the OBSERVED_STATE is ONLINE as the database is operating. Because the OBSERVED_STATE is equal to the DESIRED_STATE of ONLINE, a lifecycle event at time t1004 is determined as planned and the UNPLANNED value of the lifecycle event is FALSE.

At time t1005, the DESIRED_STATE remains ONLINE and the OBSERVED_STATE is OFFLINE as the database crashes due to a process failure. Because the database is in a state opposite of the DESIRED_STATE of ONLINE, a lifecycle event at time t1005 is determined as unplanned and the UNPLANNED value of the lifecycle event is TRUE.

FIGS. 11A, 11B, 11C, 11D, 11E, and 11F illustrate an example of a report on availability and recovery of a resource, in accordance with embodiments of the present invention.

The report comprises a heading describing the resource, a summary, an availability overview, a downtime analysis, an unplanned downtimes in relation to planned availability, an overview of state transitions of the resource, unexpected outages and corresponding recovery times that features Mean Time To Failure (MTTR), Mean Time Between Failure (MTBF), Mean Time Between System Incidents (MTBSI) values.

The abbreviations MTTR, MTBF and MTBSI are used according to the following terms. The term "Mean Time To Repair" (MTTR) indicates the average amount of time between when a service or resource breaks and when it has been repaired and is fully functional again. This term provides information about the quality of the maintainability. The term "Mean Time Between Failures" (MTBS) indicates the average amount of time a service or resource is available between failures. This term provides information about the quality of the availability. The term "Mean Time Between System Incidents" (MTBSI) indicates the average amount of time until an incident occurs. This term provides information about the quality of the reliability.

Figure 11B:
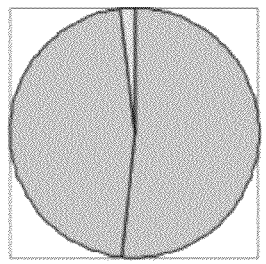
Figure 11B:
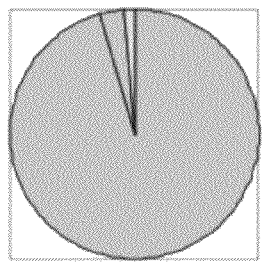
Figure 11B:
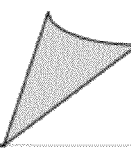
Figure 11C:
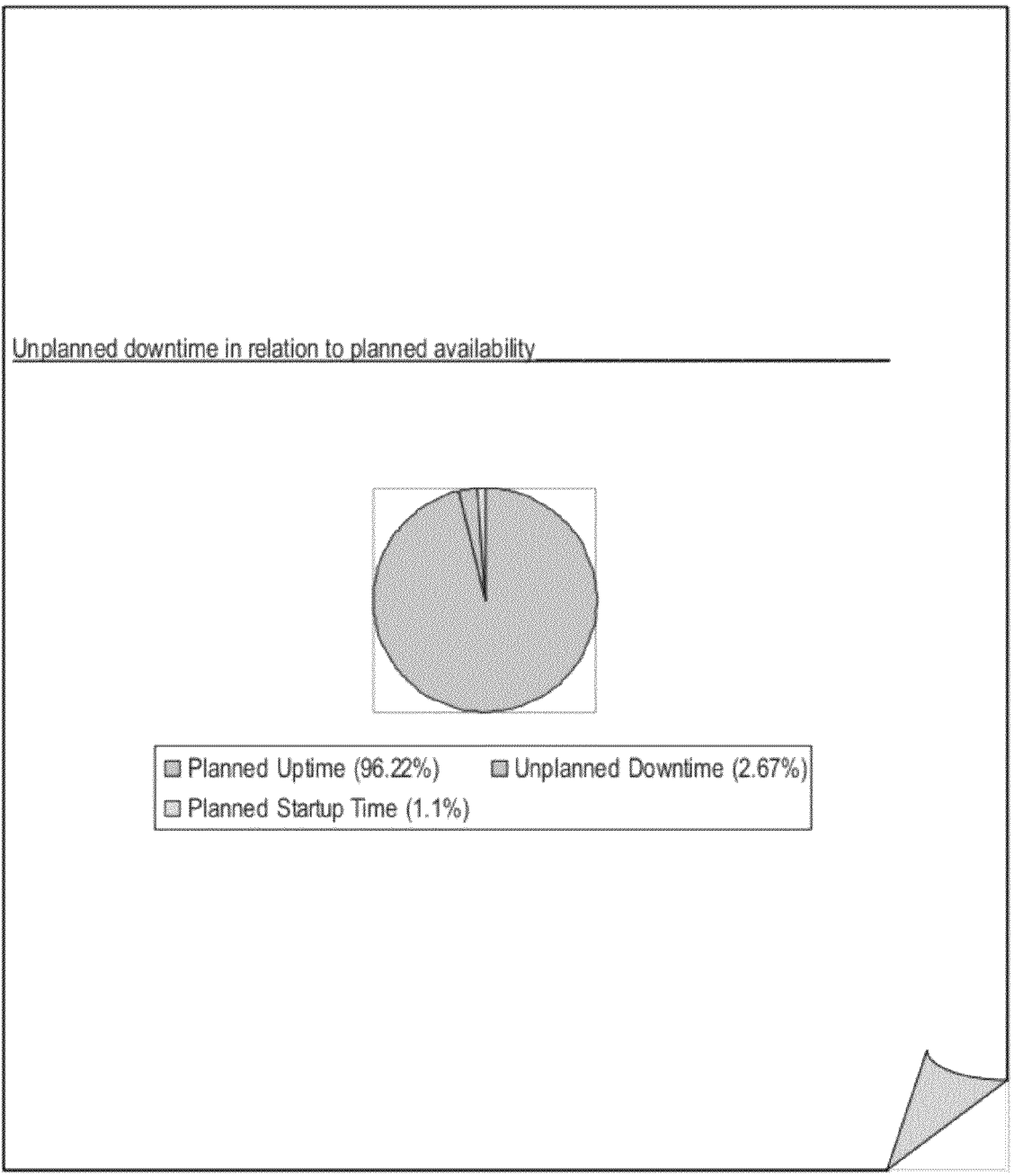
Figure 11D:
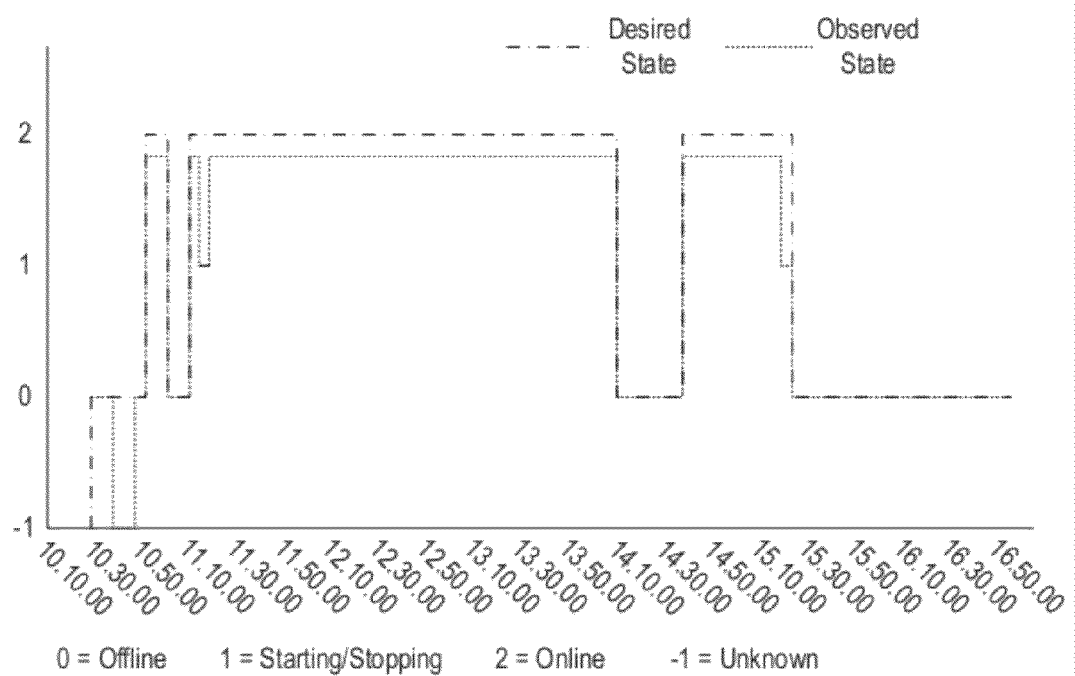
Figure 11E:
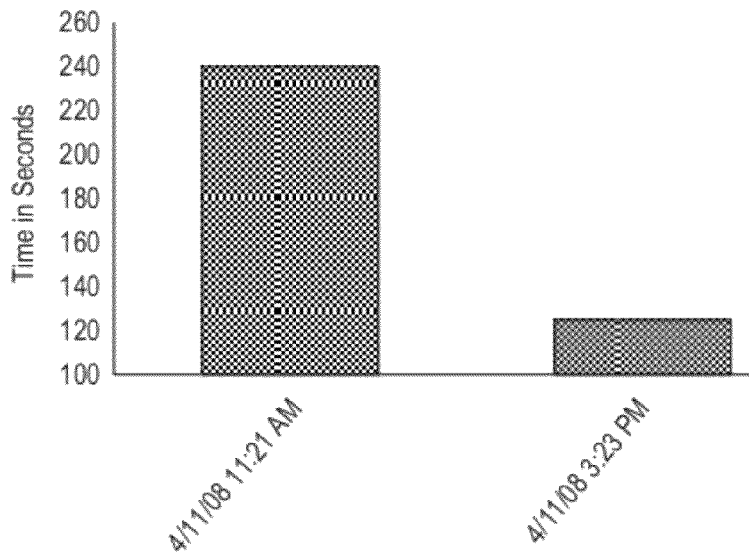
Figure 11F:
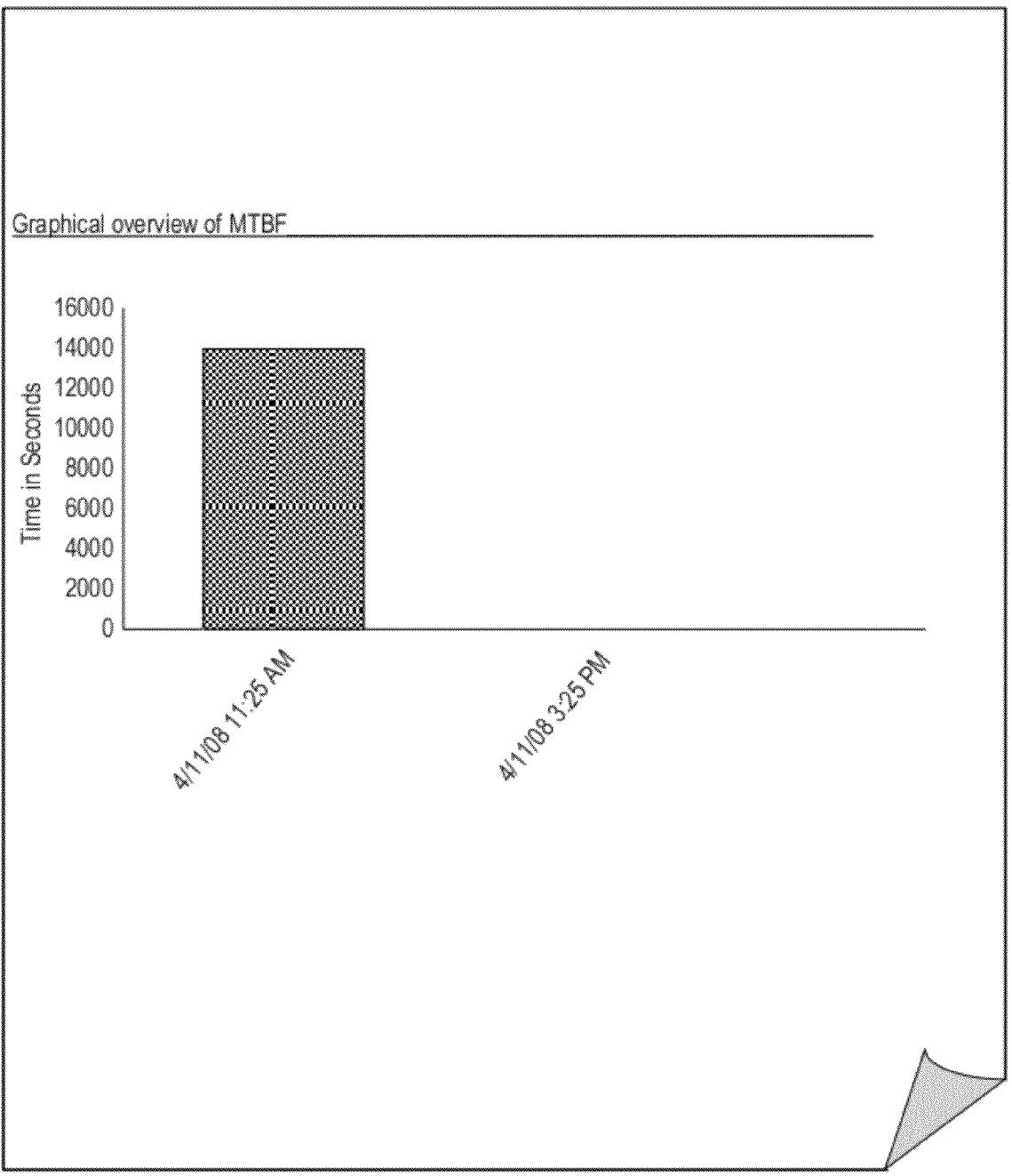

The report of FIGS. 11A, 11B, 11C, 11D, 11E, and 11F consists of two parts. The first part in FIGS. 11A and 11B provides an overview of the availability of the selected resource within the given time interval. Overall uptimes and downtimes are presented and broken down into planned and unplanned uptimes and planned and unplanned downtimes.

The second part in FIGS. 11C, 11D, 11E, and 11F presents an analysis of the unplanned downtimes that occurred in the time interval; it shows the number of incidents and the availability and recovery data you need for assessing and optimizing the disaster-recovery readiness of the analyzed information technology (IT) environment/infrastructure. All time periods, as well as the incidents are determined through the examination of a resource's events. Detailed information on the events that are taken into account and the sequences of those events that lead to certain time periods can be found in the IBM Tivoli System Automation Application Manager Administrator's and User's Guide.

FIG. 11G illustrates an example of an availability report on unplanned outages of multiple resources, in accordance with embodiments of the present invention.

Figure 12:
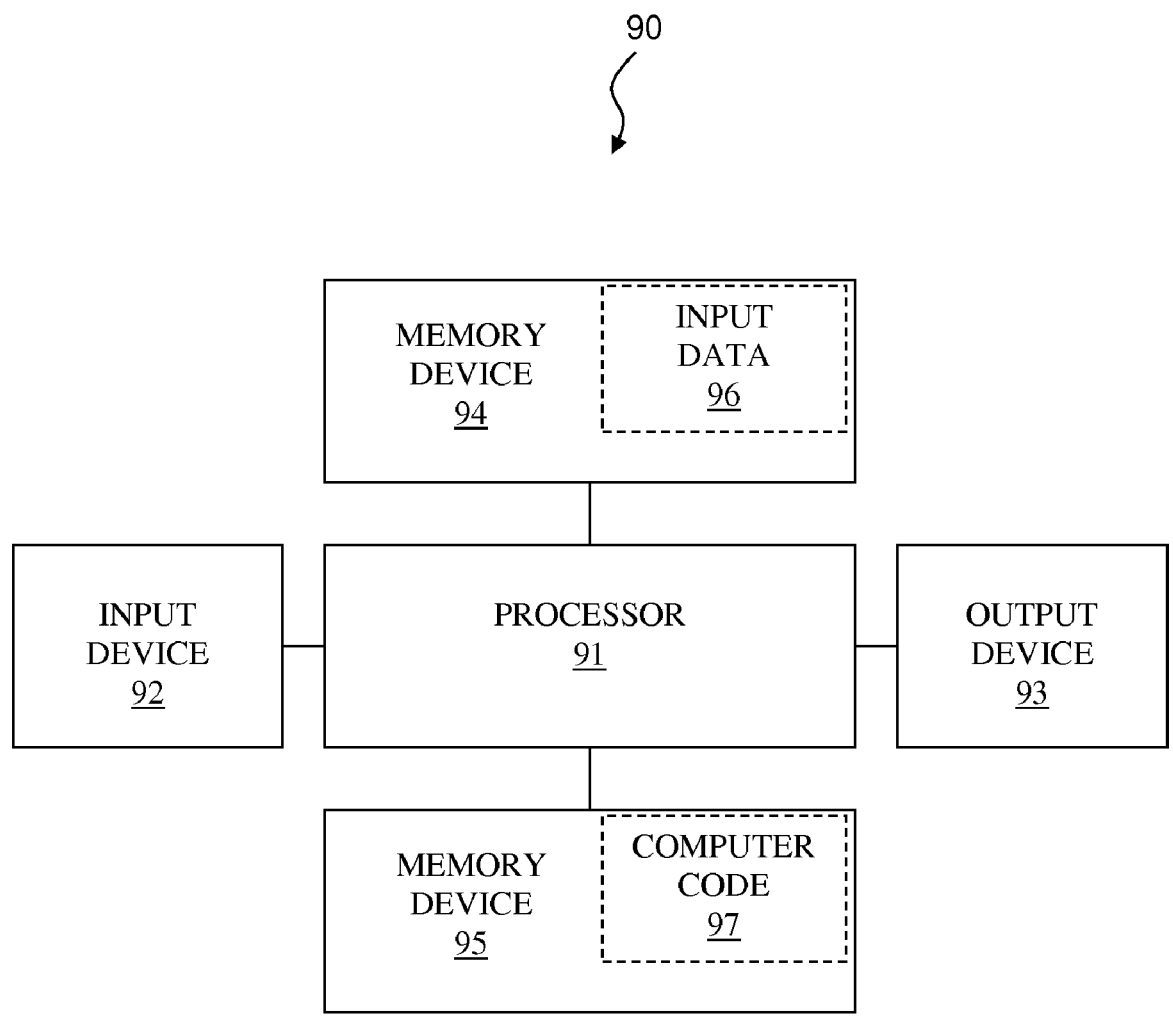
FIG. 12 illustrates a computer system used for determining availability parameters of resource in heterogeneous computing environment, in accordance with embodiments of the present invention.

FIG. 12 illustrates a computer system 90 used for determining availability parameters of resource in heterogeneous computing environment, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for determining availability parameters of resource in heterogeneous computing environment according to the present invention.

The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 12) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for determining an incident of a resource in a computing environment, the method comprising:

selecting a target state and a current state of the resource upon detecting an occurrence of an event of at least one event pertaining to the resource, the target state being a state which the resource is planned to be in, the current state being a state which the resource is actually in, wherein an event data of at least one event data is associated with the event, the selecting comprising:

selecting the target state and the current state of the resource from a state value set, the state value set comprising ONLINE, OFFLINE, STARTUP, and SHUTDOWN, wherein ONLINE denotes that the resource is available for services, wherein OFFLINE denotes that the resource is not available for services, wherein STARTUP denotes that the resource transits from OFFLINE to ONLINE, and wherein SHUTDOWN denotes that the resource transits from ONLINE to OFFLINE;

assigning a selected target state to a DESIRED_STATE parameter of the event data;

assigning a selected current state to an OBSERVED_STATE parameter of the event data; and assigning a time value when the event occurred to a TIMESTAMP parameter of the event data;

determining that the event occurred to the resource is incidental and instantiating the event data accordingly, the determining comprising:

responsive to discovering that the target state remains in a same state of ONLINE prior to and upon detecting the event and responsive to discovering that the current state has changed from ONLINE prior to the event to STARTUP upon detecting the event, setting an UNPLANNED parameter of the event data such that the UNPLANNED parameter indicates that the event is an incident; and storing the event data in a data repository of the computing environment, wherein the selecting, the determining, and the storing are performed by a system automation module of the computing environment.

2. The method of claim 1, the determining further comprising:

responsive to discovering that the target state remains in a same state of ONLINE prior to and upon detecting the event and responsive to discovering that the current state is selected from a group consisting of OFFLINE and SHUTDOWN, setting the UNPLANNED parameter of the event data such that the UNPLANNED parameter indicates that the event is an incident.

3. The method of claim 1, the determining further comprising:

responsive to discovering that the target state remains in a same state of OFFLINE prior to and upon detecting the event and responsive to discovering that the current state is selected from a group consisting of STARTUP and ONLINE, setting the UNPLANNED parameter of the event data such that the UNPLANNED parameter indicates that the event is an incident.

4. The method of claim 1, the determining further comprising:

responsive to discovering that the target state remains in a same state of OFFLINE prior to and upon detecting the event and responsive to discovering that the current state has changed from OFFLINE prior to the event to SHUTDOWN upon detecting the event, setting the UNPLANNED parameter of the event data such that the UNPLANNED parameter indicates that the event is an incident.

5. A computer program product, comprising a computer usable storage medium having a computer readable program code embodied therein, the computer readable program code containing instructions that when executed by a processor of a computer system implement a method for determining an incident of a resource in a computing environment, the method comprising:

selecting a target state and a current state of the resource upon detecting an occurrence of an event of at least one event pertaining to the resource, the target state being a state which the resource is planned to be in, the current state being a state which the resource is actually in, wherein an event data of at least one event data is associated with the event, the selecting comprising:

selecting the target state and the current state of the resource from a state value set, the state value set comprising ONLINE, OFFLINE, STARTUP, and SHUTDOWN, wherein ONLINE denotes that the resource is available for services, wherein OFFLINE denotes that the resource is not available for services, wherein STARTUP denotes that the resource transits from OFFLINE to ONLINE, and wherein SHUTDOWN denotes that the resource transits from ONLINE to OFFLINE;

assigning a selected target state to a DESIRED_STATE parameter of the event data;

assigning a selected current state to an OBSERVED_STATE parameter of the event data; and assigning a time value when the event occurred to a TIMESTAMP parameter of the event data;

determining that the event occurred to the resource is incidental and instantiating the event data accordingly, the determining comprising:

responsive to discovering that the target state remains in a same state of ONLINE prior to and upon detecting the event and responsive to discovering that the current state has changed from ONLINE prior to the event to STARTUP upon detecting the event, setting an UNPLANNED parameter of the event data such that the UNPLANNED parameter indicates that the event is an incident; and storing the event data in a data repository of the computing environment, wherein the selecting, the determining, and the storing are performed by a system automation module of the computing environment.

6. The computer program product of claim 5, the determining further comprising:

responsive to discovering that the target state remains in a same state of ONLINE prior to and upon detecting the event and responsive to discovering that the current state is selected from a group consisting of OFFLINE and SHUTDOWN, setting the UNPLANNED parameter of the event data such that the UNPLANNED parameter indicates that the event is an incident.

7. The computer program product of claim 5, the determining further comprising:

responsive to discovering that the target state remains in a same state of OFFLINE prior to and upon detecting the event and responsive to discovering that the current state is selected from a group consisting of STARTUP and ONLINE, setting the UNPLANNED parameter of the event data such that the UNPLANNED parameter indicates that the event is an incident.

8. The computer program product of claim 5, the determining further comprising:

responsive to discovering that the target state remains in a same state of OFFLINE prior to and upon detecting the event and responsive to discovering that the current state has changed from OFFLINE prior to the event to SHUTDOWN upon detecting the event, setting the UNPLANNED parameter of the event data such that the UNPLANNED parameter indicates that the event is an incident.

9. A computer system comprising a processor and a computer readable memory unit coupled to the processor, the memory unit containing instructions that when executed by the processor implement a method for determining an incident of a resource in a computing environment, the method comprising:

selecting a target state and a current state of the resource upon detecting an occurrence of an event of at least one event pertaining to the resource, the target state being a state which the resource is planned to be in, the current state being a state which the resource is actually in, wherein an event data of at least one event data is associated with the event, the selecting comprising:

selecting the target state and the current state of the resource from a state value set, the state value set comprising ONLINE, OFFLINE, STARTUP, and SHUTDOWN, wherein ONLINE denotes that the resource is available for services, wherein OFFLINE denotes that the resource is not available for services, wherein STARTUP denotes that the resource transits from OFFLINE to ONLINE, and wherein SHUTDOWN denotes that the resource transits from ONLINE to OFFLINE;

assigning a selected target state to a DESIRED_STATE parameter of the event data;

assigning a selected current state to an OBSERVED_STATE parameter of the event data; and assigning a time value when the event occurred to a TIMESTAMP parameter of the event data;

determining that the event occurred to the resource is incidental and instantiating the event data accordingly, the determining comprising:

responsive to discovering that the target state remains in a same state of ONLINE prior to and upon detecting the event and responsive to discovering that the current state has changed from ONLINE prior to the event to STARTUP upon detecting the event, setting an UNPLANNED parameter of the event data such that the UNPLANNED parameter indicates that the event is an incident; and storing the event data in a data repository of the computing environment, wherein the selecting, the determining, and the storing are performed by a system automation module of the computing environment.

10. The computer system of claim 9, the determining further comprising:

responsive to discovering that the target state remains in a same state of ONLINE prior to and upon detecting the event and responsive to discovering that the current state is selected from a group consisting of OFFLINE and SHUTDOWN, setting the UNPLANNED parameter of the event data such that the UNPLANNED parameter indicates that the event is an incident.

11. The computer system of claim 9, the determining further comprising:

responsive to discovering that the target state remains in a same state of OFFLINE prior to and upon detecting the event and responsive to discovering that the current state is selected from a group consisting of STARTUP and ONLINE, setting the UNPLANNED parameter of the event data such that the UNPLANNED parameter indicates that the event is an incident.

12. The computer system of claim 9, the determining further comprising:

responsive to discovering that the target state remains in a same state of OFFLINE prior to and upon detecting the event and responsive to discovering that the current state has changed from OFFLINE prior to the event to SHUTDOWN upon detecting the event, setting the UNPLANNED parameter of the event data such that the UNPLANNED parameter indicates that the event is an incident.

* * * * *